United States Patent [19]
Ouchi et al.

[11] 3,742,101
[45] June 26, 1973

[54] CARBON-GLASS COMPOSITE AND MANUFACTURING METHOD THEREFOR

[75] Inventors: Koji Ouchi; Michio Horie, both of Kawaguchi; Hidemasa Honda, Tosu, all of Japan

[73] Assignee: Agency of Industrial Science & Technology, Tokyo, Japan

[22] Filed: Sept. 30, 1970

[21] Appl. No.: 76,683

[30] Foreign Application Priority Data
Oct. 2, 1969   Japan.............................. 44/78166

[52] U.S. Cl............................ 264/29, 65/3, 264/60, 264/63, 264/DIG. 19, 423/445
[51] Int. Cl....................... B29c 25/00, C01b 31/00
[58] Field of Search............................ 264/29, 63; 23/209.2

[56] References Cited
UNITED STATES PATENTS

| | | | |
|---|---|---|---|
| 3,301,742 | 1/1967 | Noland et al. | 264/29 X |
| 3,231,540 | 1/1966 | Vanderbilt | 264/29 UX |
| 3,567,807 | 3/1971 | Shannon | 264/29 |
| 3,166,615 | 1/1965 | Farrell | 264/29 UX |
| 3,309,433 | 3/1967 | Roberts | 264/29 X |

FOREIGN PATENTS OR APPLICATIONS

| | | | |
|---|---|---|---|
| 518,429 | 2/1940 | Great Britain | 264/29 |

*Primary Examiner*—Donald J. Arnold
*Assistant Examiner*—David A. Jackson
*Attorney*—Kurt Kelman

[57] ABSTRACT

A carbon-glass composite is manufactured by molding and curing glass fibers mixed with a resin. The molded product is heated in a vacuum at a temperature of 200°C to 1700°C in an inert or reducing atmosphere.

2 Claims, 3 Drawing Figures

Patented June 26, 1973

INVENTORS
KOJI OUCHI
MICHIO HORIE
HIDEMASA HONDA

BY Kurt Kelman

AGENT

CARBON-GLASS COMPOSITE AND MANUFACTURING METHOD THEREFOR

This invention relates to a carbon-glass composite and a manufacturing method therefor.

The practice of forming matrixes of such thermosetting resins as polyester resin, methacrylic resin, exposy resin, phenol resin, silicone resin and melamine resin or of such thermoplastic resins as polystyrene, polyethylene, polypropylene, ABS, nylon and polycarbonate and then reinforcing the matrixes with glass fiber to produce composite materials has heretofore been well known and extensively applied to commercial production. Although these glass fiber-reinforced composite materials have a much lower specific gravity than their countertypes made solely of metals, they display such desirable qualities as equal or even greater strength and high electrical non-conductance. Further, they prove advantageous in that the method of manufacture and the method of molding are extremely simple and the cost of production is low. However, since the composites involve use of resins, the heat resistance thereof is at the most on the order of 200°C and the chemical resistance thereof is variable with the kind of resins to be used and is not necessarily satisfactory. Other serious drawbacks include hardly negligible degradation of properties due to ageing.

By contrast, carbon or graphite products which are obtained by using petroleum pitch coke, coal pitch coke, graphite, coal and coke as raw materials and pitches as binders or carbon products which use phenol resin, furan resin and furfural acetone resin as raw materials are superior in resistance to heat, chemicals, deterioration due to ageing and thermal shocks. Despite such advantages, they involve such serious shortcomings as inferior strength, conspicuously low resistance to oxygen at elevated temperatures and very great shrinkage at the time of baking. Moreover, the method of production is complicated and time-consuming.

Alumina and other inorganic ceramic products enjoy various advantages such as particularly high resistance to heat, high strength retained up to high temperatures, superior resistance to oxygen at elevated temperatures and satisfactory insulative property. Yet, they prove disadvantageous in that the production calls for a long period of treatment at elevated temperatures, products of large dimensions are difficult to manufacture, and the cost of production is extremely high.

An object of the present invention is to provide a method for inexpensive and easy manufacture of a carbon-glass composite which combines the characteristics of glass fiber with those of carbon products. According to the method of the present invention, there can be manufactured a carbon-glass composite which retains the strength of the glass fiber substantially unaffected, possesses greatly improved resistance to heat, chemicals, and oxygen at elevated temperatures and undergoes shrinkage at the time of carbonization to a lesser extent.

Other objects and characteristics of the present invention will become apparent from reading the more detailed description which is given hereinafter with reference to the attached drawing.

Figure 1:
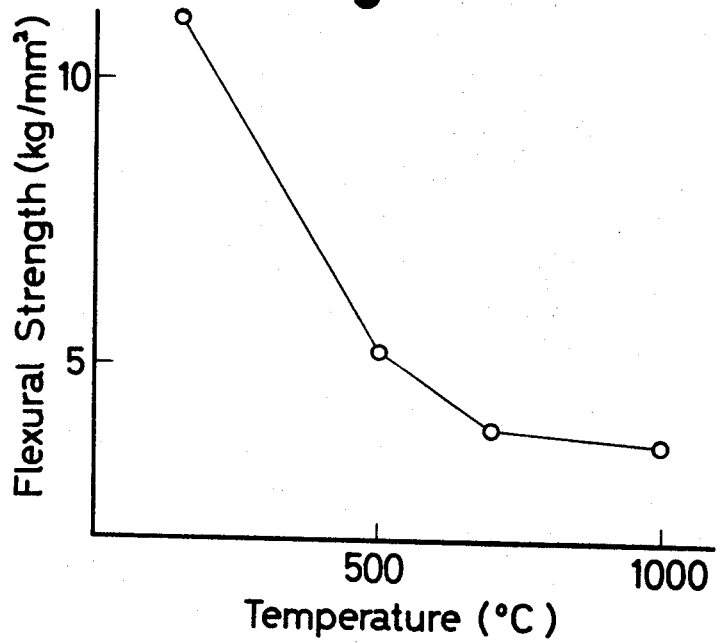
FIG. 1 is a graph showing the relationship between the temperature for heat treatment and the flexural strength as observed with the carbon-glass composite manufactured from a laminate of glass cloth and phenol resin layers in accordance with the method of the present invention.

This invention relates to a method for the manufacture of a carbon-glass composite, which method comprises the steps of molding and curing a glass fiber material with a thermosetting resin, thermoplastic resin, high temperature resistant polymers or a mixture thereof, if need be, by the use of a polymerization catalyst, a polymerization accelerator, a filler and a binding agent under normal or increased pressure at normal or elevated temperature and subsequently carbonizing the molded product at temperatures from 200° to 1700°C.

The glass fiber materials which can be used for the present invention include glass yarn, glass roving, glass cloth, glass roving cloth, glass chopped strand, glass chopped strand mat, glass mat, glass surfacing mat and glass milled fiber.

The resins which are suitable for the present use include thermosetting resins having high carbonization yield, such as phenol resins furfural acetone resin, furan resin and silicone resin, thermoplastic resins such as polyacrylonitrile and high temperature resistant polymers such as polyimide resin. These resins may be used either alone or in combination. The aforementioned resins may, as occasion demands, incorporate, as a filler or a binding agent finely pulverized petroleum pitch, thermal-cracking pitch, coal, coke, graphite, carbon black, pitch, asphalt or glass.

Instead of using these resins, monomers from which such resins are made may be combined with a polymerization catalyst, a polymerization accelerator and, if required, further with a filler and a binding agent and then polymerized and cured either during or after the step of molding with the glass fiber. In the case where one immersion of the glass fiber in the resin fails to permit the glass fiber to acquire a sufficient amount of resin, the immersion may be repeated a few times until there is acquired a sufficient amount of resin. These resins are used in the form of a fine powder or of, a liquid or are dissolved in suitable solvents.

According to this invention, the molding of a glass material and a resin or a mixture of the resin with a filller or a binding agent is accomplished under an increased pressure at temperatures not exceeding 200°C where both are in powdered form. Where the resin is a liquid, a solution or a suspension, the molding is effected by such methods as hand the lay-up method, spray-up method, filament winding method, matched metal-die method, continuous laminating method, continuous drawing method, injection molding method, centrifugal molding method and pour molding method as are usually employed in the manufacture of ordinary glass-fiber composite materials.

These molding methods are entirely identical with those which have heretofore been used for manufacturing composite materials through reinforcement of resins with glass fiber.

The molded product which has been obtained by the aforementioned method is heated gradually in a vacuum, in the atmosphere of an inert gas or in the stage of being buried under such reducing substances as powdered coke. The heating is desirably controlled to the rate of 0.01 – 3°C/min (0.60–180°C/Hr.) in the temperature range of 200° – 500°C, 0.5° – 10°C/min (30°–600°C/Hr.) in the temperature range of 500° – 1000°C and 1° – 30°C/min (60°–1800°C/Hr.) in the temperature range of 1000° – 1700°C respectively.

If heating is too rapid, the gasses which are liberated upon decomposition of the resin causes layer separation in the molded product.

The final product which has been obtained by any of the methods just mentioned, as compared with the molded product obtained in the first stage, has undergone a relatively small dimentional change due to contraction during the step of carbonization. In the case of a laminate of phenol resin and glass cloth layers, for example, the dimensional change in the directions within the plane of the laminae is on the order of 0 – 10 percent, though variable with the thickness of the laminate. In most cases, however, the change is very little or, at the most, below a few hundredths of the original size. A little larger contraction occurs in the direction perpendicular to the laminae.

The temperature which the carbonized product can tolerate decided by its final carbonization temperature. While the ordinary glass fiber-reinforced resin withstands temperatures up to 200°C at the most, the product of this invention offers high resistance to temperatures from at least 200°C up to the maximum of 1700°C. Thus, a final product having thermal properties suitable for the intended use can be obtained by properly selecting the carbonizing temperature.

The strengths of the product to be manufactured by the method of the present invention vary with such factors as molding method, kind of resin, molded shape, carbonizing atmosphere, heating rate and temperature for final heat application. Generally, since there occurs thermal decomposition of the resin and the contracton is small and, consequently, the porosity is not eliminated completely, it is inevitable that the final product will have lower strengths than those of the original molded product. Nonetheless, the product exhibits flexural strength of 3 – 15 kg/mm$^2$, compared with 1 – 3 kg/mm$^2$ obtained with the ordinary carbon products. Thus, the product of this invention can easily acquire strengths of a level that is unattainable by such countertypes.

Referring to FIG. 1, the graph shows the relationship between the carbonizing temperature and the flexural strength of the laminate of phenol resin and glass cloth. The product treated at a carbonizing temperature of 500°C has a flexural strength of about 5 kg/mm$^2$ and that treated at 1000°C a flexural strength of about 3.5 kg/mm$^2$.

The product to be manufactured according to the present invention is almost free from attack by ordinary inorganic acids and alkalis such as sulfuric acid, hydrochloric acid, phosphoric acid and caustic soda solution, corrosive gases such as chlorine and ordinary organic solvents. When test specimens of a product made by carbonizing a laminate of phenol resin and glass cloth layers at 1000°C were immersed in various industrial chemicals at room temperature for 24 hours (70 hours for the items indicated by the asterisk "*"), they showed weight changes as given in Table 1. In all the test specimens, the weight change was negligibly small and the appearance remained unchanged.

TABLE 1

| Name of Chemical | Ratio of weight change | Name of chemical | Ratio of weight change |
| --- | --- | --- | --- |
| Conc. sulfuric acid | +1.8* | Ammonia water | –0.8 |
| Fuming nitric acid | –0.9 | Methyl alcohol | 0 |
| Conc. hydrochloric acid | –0.4 | Acetone | 0 |
| Conc. phosphoric acid | –0.5* | Benzene | 0 |
| Acetic acid | 0 | Quinoline | +0.3 |
| Caustic soda (30%) | +0.3 | | |

Figure 2:
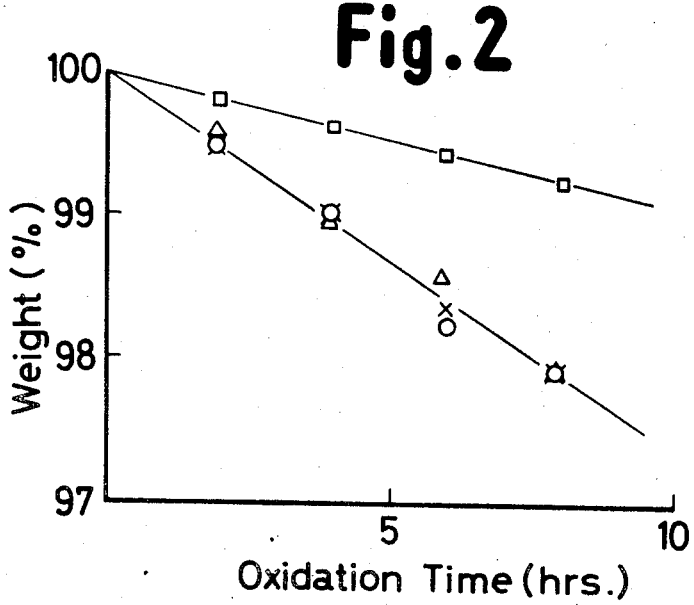
FIG. 2 is a graph showing the decrease in weight with time as observed for four carbon-glass composites which being manufactured by treating a laminate of glass cloth and phenol resin at 1600°C, 1400°C, 1200°C and 100°C respectively were retained in air at 400°C.
Figure 3:
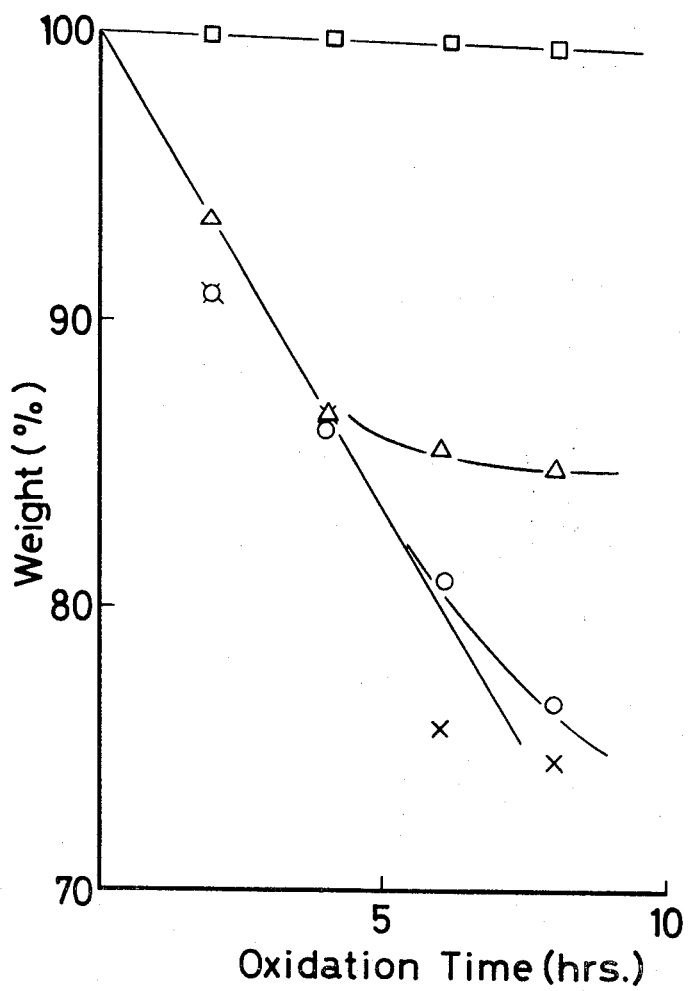
FIG. 3 is a graph showing the decrease in weight with time when the carbon-glass composites of FIG. 2 were retained in air at 400°C.

In FIG. 2, the graph shows the decrease in weight of the product with time as observed for four carbon-glass composites which being manufactured by treating a laminate of glass cloth and phenol resin at 1600°C (☐), 1400°C (△), 1200°C (X) and 1000°C (○) respectively were retained in air at 400°C. In FIG. 3, the graph shows the decrease in weight of the product with time as observed when the four products of FIG. 2 were retained in air at 600°C. Although hitherto know carbon products are easily burned when retained in air at 600°C, the carbon-glass composite manufactured by the method of this invention is reduced in weight only by a few percent even when held at 400°C for about nine hours. In particular the carbon-glass composite treated at 1600°C decreased in weight by a mere 1 percent when retained at 600°C for about nine hours.

Further, the product obtained according to this invention exhibits very high resistance to thermal shocks as do graphite, carbon and quartz. When the product is heated to 1000°C and then immersed immediately into water, for example, it neither suffers from change of shape nor develops any cracks.

In following, preferred embodiments of the invention are cited by way of furnishing a more detailed description of this invention. It should be understood that the invention is, in no way, limited to these examples.

EXAMPLE 1

11 crowfoot satin-weave glass cloths impregnated with methanol solution of phenol resin (resol) were heated at about 140°C for about 4 minutes to evaporate the solvent and then piled one on top of another, and compression molded for 40 minutes under a pressure of 25 kg/cm$^2$ at 165°C. The molded product thus formed was buried under powdered coke and carbonized at 1000°C. Consequently, there was obtained a carbon-glass composite having an apparent specific gravity of 2.04, a porosity of 15.7 percent, a flexural strength of 6.66 kg/mm$^2$, an electric resistance of 0.15Ω. cm and a glass content of 80.7 percent.

EXAMPLE 2

100 commercially available plain weave glass cloths were each impregnated with the methanol solution of resol type phenol resin (residual resin 60 percent by weight after heating at 180°C) and piled one on top of another. The laminate was gradually heated to 180°C under a pressure of 1 – 10 kg/cm$^2$ and then held at this temperature for one hour. The laminate thus cured was found to contain the resin at about 28 percent by weight. This laminate was carbonized in a vacuum at the heating rate of 3°C/min to 350°C, 1°C/min between 350° and 500°C, and 3°C/min between 500° and 1000°C respectively. Consequently, there was obtained a carbon-glass composite which had an apparent specific gravity of 1.4, a true specific gravity of 2.4, a resin decomposition ratio of 43.8 percent and a flexural strength of 4 kg/mm$^2$, and which had a metallic sound.

EXAMPLE 3

The same methanol solution of phenol resin as used in Example 2 was mixed with a naphtha-cracking pitch (softening point 160°C) ground to below 100 mesh at the resin-pitch weight ratio of 35:65 to produce a uniform suspension. This suspension was converted into a state of nonviscous solution by the addition of methanol at the ratio of 15 g per 100 g of the suspension. When 30 glass cloths were piled one on top of another and cured by using this solution in the place of the phenol resin of Example 2, the cured product was found to contain this mixture at 46 percent by weight (total weight of resin and pitch). By following the same procedure as in Example 2 from this point onward, the carbon-glass composite obtained consequently was found to have an apparent specific gravity of 1.2, a true specific gravity of 2.2, and a flexural strength of 7 kg/mm$^2$. The contraction at the time of carbonization was found to be nearly zero in the plane of the laminae and 16 percent in the direction perpendicular to the laminae.

EXAMPLE 4

The procedure of Example 3 was followed to form a laminate, except the resin-pitch mixing ratio was 50:50 instead of 35:65 and the subsequent addition of methanol was omitted. When the resultant laminate was carbonized at 1000°C, there was obtained a carbon-glass composite having a flexural strength of 4 kg/mm$^2$, an apparent specific gravity of 1.4 and a true specific gravity of 2.2.

EXAMPLE 5

The procedure of Example 3 was followed to form a laminate, except the resin-pitch mixing ratio was 10:90 Instead of 35:65 and methanol was added in a slightly increased volume to retain the non viscous state of the suspended solution. Consequently, there was obtained a product which was found to have strengths slightly inferior to those of the composite of Example 3.

EXAMPLE 6

A glass roving was impregnated with the same methanol solution of phenol resin as used in Example 2. The impregnated glass roving was wound by the filament winding method on a molding pipe (15 mm in outside diameter and 13 mm in inside diameter), while excess resin adhering to the surface was removed by squeezing. The wound product was wrapped in an aluminum foil or a cellophane sheet and then held at 180°C for one hour to be cured. The pipe thus molded had an outside diameter of 21.0 mm and an inside diameter of 15 mm and contained about 10 - 20 percent by weight of resin. This pipe was buried under powdered coke and heated at the rate of 10°C/hour up to 500°C, 17°C/hour between 500° and 700°C and 160°C/hour between 700° and 1000°C respectively. Consequently, there was obtained a carbon-glass composite pipe having high strengths. This pipe was 19.5 mm in outside diameter and 14.3 mm in inside diameter.

EXAMPLE 7

A steel pipe which had an outside diameter of 62.5 mm and which was so devised as to be divided axially into two halves was wrapped in an aluminum foil, on which polyvinyl alcohol was spread as a mold-releasing agent. Then, a glass roving was wound on the pipe in the same manner as in Example 6 and then heated at 180°C for the purpose of curing. The cured pipe from which the steel pipe had been taken out was found to have an outside diameter of 73 mm. When this pipe was buried and carbonized under powdered coke in the same manner as in Example 6, the carbon-glass composite pipe obtained consequently had an outside diameter of 69.8 mm and an inside diameter of 58.6 mm.

EXAMPLE 8

Furfural and acetone were mixed at the mol ratio of 2:5. Concentrated sulfuric acid in an amount corresponding to 5 percent by weight and benzoyl peroxide in an amount corresponding to 1 percent by weight respectively of the resultant mixture were combined with the mixture and mixed sufficiently. A glass roving was immersed in the resultant solution and then wound on a pipe in the same manner as in Example 6 and then heated at 180°C for one hour for curing. The cured product was found to have insufficient resin content. So, it was again immersed in the monomer mixture and heated at 180°C for one hour to be cured. After the treatment of immersion and curing had been repeated ten times, the cured product was carbonized in the same manner as in Example 6. Consequently, there was obtained a carbon-glass composite pipe having high strengths.

EXAMPLE 9

A pipe which had been formed and cured in the same manner as in Example 6 was heated up to 1000°C as in Example 6 and was further heated in a vacuum by using a Tamman's furnace at a heating rate of 20°C/min between 1000° and 1600°C. When the temperature reached 1600°C, the power source of the furnace was immediately cut off to allow the pipe to cool off. The carbon-glass composite pipe thus obtained was found to be sufficiently useful as a carbon product, though it had somewhat inferior strengths and more porosity.

EXAMPLE 10

Novolak resin prepared by mixing phenol and formalin at a mol ratio of 1:1 in the presence of hydrochloric acid as a catalyst was combined with 10 percent by weight of hexamine and mixed sufficiently. The mixture thus obtained was put uniformly between the layers of a pile of 20 glass cloths. This pile was heated at 180°C under a pressure of 1 - 10 kg/cm$^2$ for one hour. When the resultant laminate was carbonized under the same conditions as in Example 2, there was obtained a carbon-glass composite laminate.

EXAMPLE 11

10 glass mats were immersed and laminated in the dimethyl-formamide solution of polyacrylonitrile. The laminate was held in an air bath at 160°C to vapourize the solvent, during which treatment a load of about 10 kg was exerted thereon to complete the molding of the laminate. When almost all the solvent had been removed, the laminate was gradually heated to 250°C and then held at this temperature for about 10 hours so that the color changed to black. This laminate afforded a carbon-glass composite when it was carbonized under the same conditions as in Example 2.

What is claimed is:

1. In a method for the manufacture of carbon-glass composite wherein molded and cured glass fiber reinforced resin structure is carbonized, the improvement consisting of heating the cured structure under a coke bed:

A. at a first temperature rate of 0.60°–180°C/Hr. from 200°C. to 500°C.;
   B. at a second temperature rate of 30°–600°C/Hr. from 500°C. to 1000°C.; and
   C. at a third temperature rate of 60°–1800°C/Hr. from 1000°C. to 1700°C.;

said heating being to at least a temperature of 1000°C., and recovering a product having a flexural strength of 3–15 Kg/mm$^2$.

2. In a method for the manufacture of carbon-glass composite wherein molded and cured glass fiber reinforced resin structure is carbonized, the improvement consisting of heating the cured structure under vacuum:

A. at a first temperature rate of 0.60°–180°C/Hr. from 200°C. to 500°C.;
   B. at a second temperature rate of 30°–600°C/Hr. from 500°C. to 1000°C.; and
   C. at a third temperature rate of 60°–1800°C/Hr. from 1000°C. to 1700°C.;

said heating being to at least a temperature of 1000°C., and recovering a product having a flexural strength of 3–15 kg/mm$^2$.

* * * * *